July 22, 1924.

J. H. H. VOSS 1,502,363

VALVE SPRING

Filed Feb. 17, 1922

Patented July 22, 1924.

1,502,363

UNITED STATES PATENT OFFICE.

JOHANN HEINRICH HERMANN VOSS, OF NEW YORK, N. Y.

VALVE SPRING.

Application filed February 17, 1922. Serial No. 537,346.

*To all whom it may concern:*

Be it known that I, JOHANN HEINRICH HERMANN VOSS, citizen of the United States, and a resident of New York, in the county of New York and State of New York, have invented certain new and useful Improvements in Valve Springs, of which the following is a specification.

My invention relates to valve springs and more particularly to springs for automatic ring plate valves. In such valves, heretofore, recesses were formed in the valve cap and spiral or conical springs inserted in said recesses. The ends of said springs abut against the ends of said recesses, while the central portion of the springs projects from the cap and engages the plate valve.

The machining of such recesses is tedious, as they have to be machined separately and their ends have to be formed by drilling.

It is an object of my invention to overcome these drawbacks and to provide a spring which may be inserted in a continuous groove of the cap, such groove being formed by turning or milling in one operation. In this annular groove (or grooves, as the case may be,) I insert an undulated spring. The spring, the ends of which may be connected so as to form an annulus corresponding to the annular groove in the cap, has a plurality of undulations which abut against the bottom of said groove on the one hand and the valve plate on the other.

In this manner, the mass of the spring is doubled as compared with the device above referred to and very little space is required for arranging it. At the same time, the valve cap is simplified and its manufacture facilitated, for the reasons given above.

In the drawings affixed to this specification and forming part thereof, a spring embodying my invention and a cap in which said spring may be housed, are illustrated by way of example.

Figure 1:
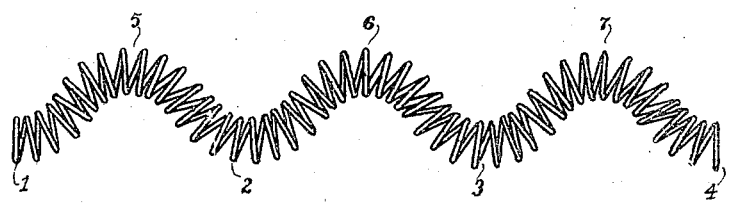
Fig. 1 is an elevation of my improved spring.
Figure 2:
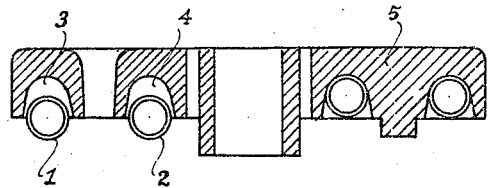
Fig. 2 is a section of a valve cap.

The ends 1 and 4 of the spring shown in Fig. 1 are preferably ground flat in order to facilitate their joining together. When the ends have been so joined, the spring forms an annulus which may be inserted in one of the annular grooves 3 and 4 of the cap 5, as indicated at 1 and 2 in Fig. 2.

The spring is provided with a plurality of undulations 2, 3, 5, 6 and more. In operation, these undulations will alternately project from the face of the valve cap, as shown on the left in Fig. 2, and exert pressure on the valve plate or plates, not shown, or they will be concealed in the groove or grooves of the cap, as shown on the right in Fig. 2.

I wish it to be understood that I am not limited to the example illustrated and described, as modifications may be made without departing from the spirit of my invention.

I claim:

As a new article of manufacture, an undulated valve spring formed of a straight wire coil.

Signed at New York city, in the county of New York and State of New York, this 16th day of February A. D. 1922.

JOHANN HEINRICH HERMANN VOSS.